Nov. 28, 1967        W. BEIG        3,354,751

DUAL GENERATORS FOR ELECTRICALLY OPERATED GEAR TRANSMISSIONS

Filed July 28, 1965        2 Sheets-Sheet 1

United States Patent Office 3,354,751
Patented Nov. 28, 1967

3,354,751
DUAL GENERATORS FOR ELECTRICALLY OPERATED GEAR TRANSMISSIONS
Willy Beig, Friedrichshafen-Waggershausen, Germany, assignor to Zahnradfabrik Friedrichshafen, Atiengesellschaft, Friedrichshafen am Bodensee, Germany
Filed July 28, 1965, Ser. No. 475,454
Claims priority, application Germany, Aug. 1, 1964, Z 11,003
5 Claims. (Cl. 74—752)

This invention relates to gear transmissions including shifting means which are operable by fluid under pressure and adapted to be controlled by solenoid operated valves and more particularly to generators for producing electric current to energize the control solenoids.

One of the difficulties in electrically controlled transmissions is the possibility of damage to the transmission in the event of generator failure. Such failure results in loss of current which effects down shift of the transmission from a higher gear to first gear. The damage may be severe enough to destroy the transmission where current failure occurs when the vehicle operated by the transmission is in a high gear.

Accordingly, it is an object of the invention to provide a dual or twin generator such that either generator can maintain the transmission in gear and thus guard against down shift even though the other generator has failed. It is another object of the invention to provide an arrangement which is relatively simple electrically and mechanically.

According to the invention various arrangements of generators may be made wherein two generators may be incorporated in the same housing or individual generators may be carried at the ends of the transmission housing and driven thereby. In either arrangement such generators are of equal current output and connected in parallel. The total current is required for effecting shifting of gears, but the current of either generator is sufficient to hold gears in shifted position. Accordingly, although both generators are required to shift gears, should one generator fail when the transmission is in any particular gear, the operator will be warned of this by the fact that he is unable to upshift the transmission, although the transmission will remain in the gear at which it happens to be when either generator fails.

A detailed description of the invention now follows in conjunction with the appended drawing in which.

Figure 1:
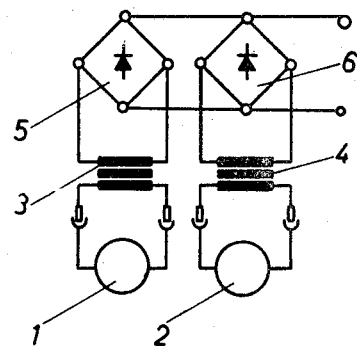
FIG. 1 is an electrical schematic diagram of a pair of AC generators connected in parallel, this being, the basis of the invention.

Referring to FIG. 1, there is represented two generators 1 and 2 connected in parallel via respective transformers 3 and 4 and respective one-wave rectifiers 5 and 6. The circuitry is entirely conventional and represents the mode of connection for the various generators hereinafter described.

It will be noted that either generator 1 or 2 can fail without fully cancelling the parallel output. In other words, there will be at least ½ current output even with one generator becoming defective.

Figure 2:
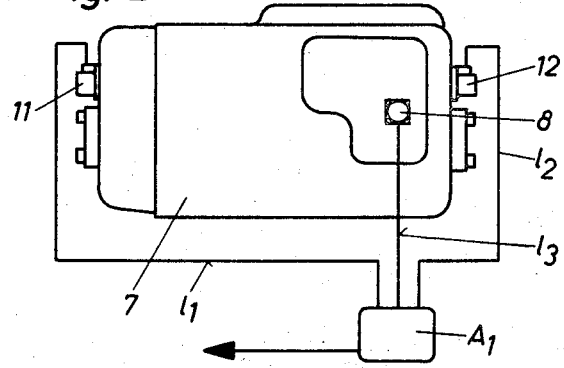
FIG. 2 is an illustration of a transmission housing equipped with a generator at each end thereof.

FIG. 2 illustrates a transmission housing 7 having a solenoid arrangement 8 with a generator 11 at one end of the housing and another generator 12 at the other end. These may be AC generators with transformers and rectifiers as set forth in the schematic of FIG. 1. The parallel output is conducted through lines $l_1$ and $l_2$ to an automatic controller $A_1$ which will be understood to be operated by mechanical control, as indicated by the arrow for the purpose of effecting energization of solenoids (not shown) through the multi-core cable $l_3$. The controller and solenoid arrangement is entirely conventional and of a type in present use, and the particular feature of the invention, as shown in FIG. 2, is the provision of a generator at each end of the transmission housing in which each generator is driven by mechanical coupling to the driven shaft of the transmission. The arrangement is particularly suitable for transmissions operable from torque converters wherein the transmission has a driven shaft connecting to a clutch for bridging the torque converter. Any suitable generator mounting and coupling shaft construction may be used, a matter of design well within the skill of engineers in the art.

Figure 3:
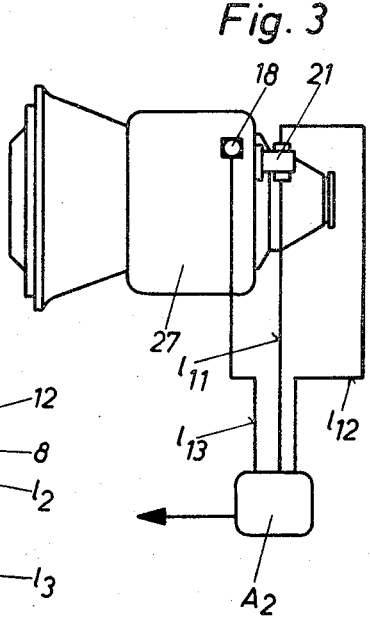
FIG. 3 is an illustration of a transmission housing equipped with a dual type generator in a single housing.

Although separate generators are used in FIG. 2, FIG. 3 illustrates an arrangement wherein a twin generator 21 may be carried by the transmission box 27 and wherein the parallel output of the generators is carried by lines $l_{11}$ and $l_{12}$ to controller $A_2$ and wherein a multi-core cable $l_{13}$ connects to the solenoid actuation system.

Figure 4:
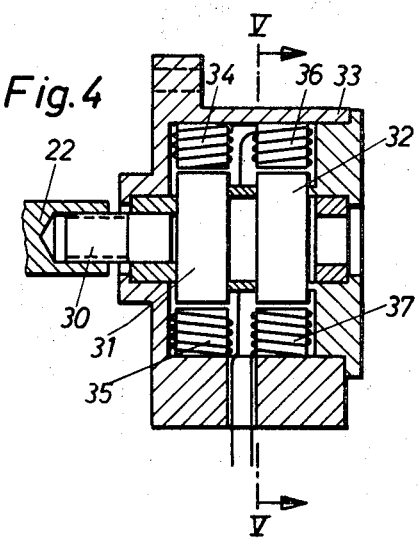
FIG. 4 is a cross sectional elevation of the dual generator.
Figure 5:
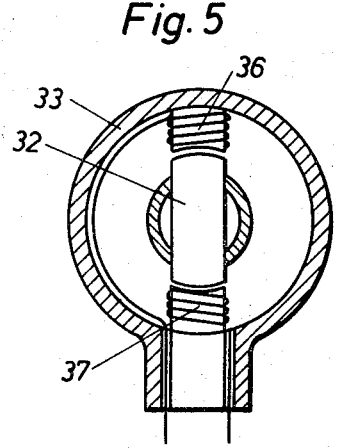
FIG. 5 is a section through V—V of FIG. 4.

FIGS. 4 and 5 show a compact twin generator comprising a single housing 33 in which a rotor comprising a pair of bar magnets 31 and 32 are rotated by a shaft 30 coupled to an output shaft 22 of a gear transmission. Associated with magnet 31 are coils 34 and 35, while associated with magnet 32 are field coils 36 and 37. It will be understood that the wiring is such that each magnet constitutes the armature of a separate generator and that the coils 34 and 35 have current inducted in them by magnet 31, and that the coils 36 and 37 have current induced in them by magnet 32.

It will, of course, be appreciated that the magnets 31 and 32 may be an integral magnet extending between the two pairs of coils.

It will further be appreciated that the generator is rotated at a speed commensurate with the speed of travel of the vehicle, being coupled in any suitable manner to the secondary drive of the transmission.

Figure 6:
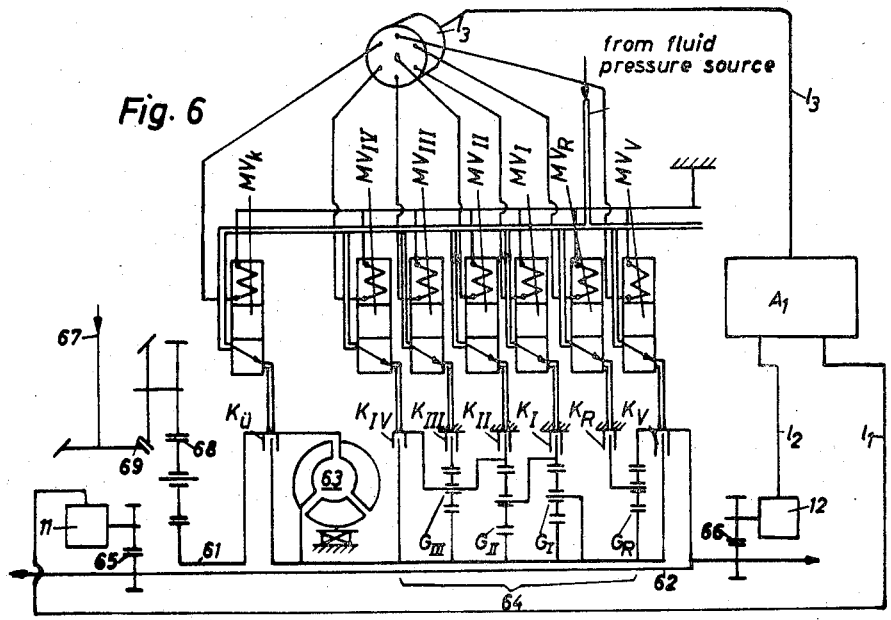
FIG. 6 is a schematic diagram of the components of a transmission with the arrangement of two generators for producing electric current to energize the control solenoids.

FIG. 6 shows a schematic diagram of a transmisison including a hydraulic torque converter-coupling and a gearing device having a plurality of speed ratios. This transmission construction is disclosed in the application of Otto Schwab, S.N. 242,843, filed Dec. 6, 1962, now Patent No. 3,238,817. An automatic control system for said transmission is disclosed in an application of Willi Kühnle and Walter Frei, filed with this application, S.N. 475,462.

Referring to FIG. 6, the input shaft 61, of the transmission is directly coupled to the impeller of the hydraulic torque converter 63. The clutch $K_{ü}$ is provided to lock up the torque converter 63.

In the gearing device 64 three planetary gear sets $G_I$, $G_{II}$, $G_{III}$ are arranged for driving connection the input shaft 61 and driven shaft 62. For reverse drive the planetary gear set $G_R$ is arranged, which will be made effective by brake $K_R$. For effecting forward drive the brake $K_R$ is released and the clutch $K_V$ is engaged locking-up the gear set $G_R$. Each of said three planetary gear sets has a brake $K_I$, $K_{II}$, $K_{III}$ for establishing three geared speed ratios. A clutch $K_{IV}$ is arranged for providing a direct drive between the input shaft 61 and the driven shaft 62. For completing said speed ranges in forward drive, the clutch $K_V$ must be engaged, for completing said speed ranges in reverse drive, the brake $K_R$ must be engaged. All said brake and clutch means are operable by fluid under pressure which is controlled by valve means. These valve means are solenoid operated valves. Accordingly, each of said brake and clutch means is combined with a hydraulic motor including a cylinder with a piston and a solenoid operable valve as follows: $K_V$ with $MV_V$; $K_R$ with $MV_R$; $K_I$ with $MV_I$; $K_{II}$ with $MV_{II}$; $K_{III}$ with $MV_{III}$; $K_{IV}$ with $MV_{IV}$ and $K_{\ddot{u}}$ with $MV_K$. The coils of said solenoid operated valves are connected with the automatic controller $A_1$ by a multi-core cable $l_3$.

In the embodiment of FIG. 6, the generators 11 and 12 of FIG. 2 are arranged on the front end and on the rear end of the transmisison; each of both generators is drivingly connected with the driven shaft 62 by a gear set 65 respectively 66.

The input shaft 61 of the transmission is drivingly connected with the drive shaft 67 by a spur gearing 68 and a bevel gearing 69. The drive shaft 67 can be the crankshaft of an internal combustion engine.

Figure 7:
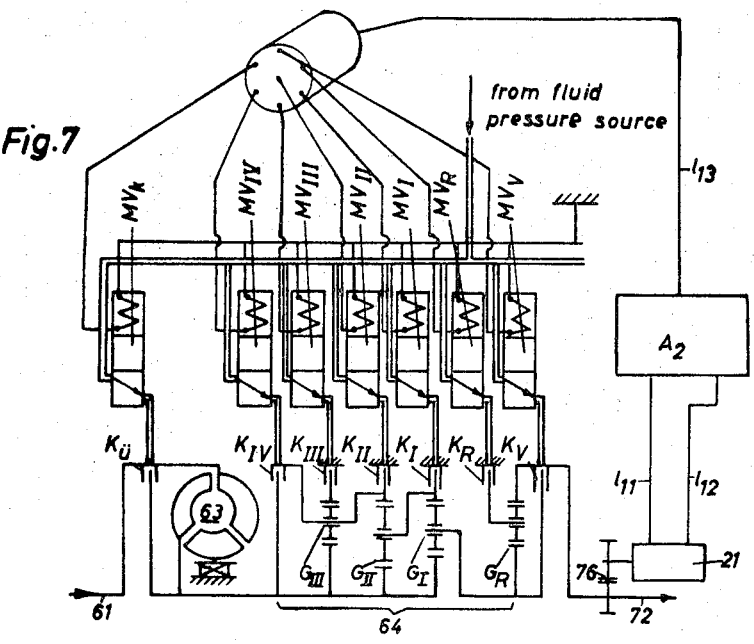
FIG. 7 is a schematic diagram of the transmission with the arrangement of a twin generator.

In the embodiment of FIG. 7 on the rear end of the transmission a twin generator 21 (as shown in FIG. 3) is arranged and drivingly connected with the driven shaft 72 by a spur gearing 76. The parallel output is transmitted by the cable conductors $l_{11}$ and $l_{12}$ to the automatic controller $A_2$ which causes the actuation of the electromagnetic valving device by energizing of solenoids to control the engagement and disengagement of brake and clutch means of the transmission in response to the output speed of the transmission.

In essence the combination of the invention is entirely conventional insofar as providing a source of current effected by a generator with an automatic controller, such as $A_1$ or $A_2$ for controlling current to the solenoid operated valves of the hydraulic shifting device of the automatic transmission. Although only three leads, $l_1$, $l_2$ and cable $l_3$ are shown or $l_{11}$, $l_{12}$ or cable $l_{13}$, it will be understood that the return current is effected through grounding of one of the terminals of each of the generators. In effect, therefore, the solenoids are operated by a single current, as will be understood from the diagram of FIG. 1, although such current comes from two sources. Where, however, there is a breakdown of either source, the current from the remaining source will be sufficient to prevent down shift of the transmission and, thus, avoid damage to the gears.

Having thus described the invention, it is realized that changes may be made without departing from the spirit thereof and, therefore, it is not desired that the invention be limited to the precise illustration herein given except as set forth in the following claims:

What I claim is:
1. In a control system for a multispeed power transmission having an input shaft and a driven shaft, a hydraulic torque converter and a gearing device including clutch and brake means for establishing a plurality of delivery paths between said input shaft and said driven shaft, a fluid pressure source, fluid pressure operated servo means for engaging and disengaging said clutch and brake means, a source of electric power, solenoid operated valve means for shifting said servo means and selectively distributing said fluid pressure to said servo means and an automatic control device for connecting said source of electric power to the circuit of corresponding solenoid operated valve in response to the speed of said driven shaft, a pair of generators as said source of electric power drivingly connected with the driven shaft, said generators being connected in parallel and effecting a current the strength of which is sufficient for upshifting said transmission to higher gear speeds, each of said generators having a current strength sufficient to maintain said transmission in a selected gear speed and sufficient for downshifting said transmission in lower gear speeds.

2. In a control system for an automatic power transmission as set forth in claim 1, in which said generators comprise a housing having stator coils in individual circuits for effecting two current sources, and a shaft with magnetic means thereon rotative with respect to said stator coils, said stator coils effecting said separate current sources wherein each of such current sources is sufficient to maintain said transmission at a selected speed ratio and sufficient to downshift said transmission in lower speed ratios.

3. In a control system for an automatic power transmission as set forth in claim 2, wherein said magnetic means comprises a bar magnet and said stator coils are arranged transversely thereof.

4. In a control system for an automtaic power transmission as set forth in claim 1, said generators being disposed on opposite sides of said transmission housing and drivingly connected with the driven shaft of said transmission.

5. In a control system for an automatic power transmission as set forth in claim 1, said generators being alternating current types, and means for effecting rectification of individual outputs thereof, wherein said rectified outputs are connected in parallel.

References Cited
UNITED STATES PATENTS

| | | | |
|---|---|---|---|
| 2,718,157 | 9/1955 | Schaub | 74—472 |
| 2,891,411 | 6/1959 | Sutherland et al. | 74—472 |
| 2,952,346 | 9/1960 | Costa et al. | 74—472 |
| 3,238,817 | 3/1966 | Schwab | 74—759 X |

DONLEY J. STOCKING, *Primary Examiner.*

T. C. PERRY, *Assistant Examiner.*